United States Patent
Williams et al.

(10) Patent No.: US 12,262,846 B2
(45) Date of Patent: Apr. 1, 2025

(54) PORTABLE OVEN CONFIGURED FOR MULTIPLE DIFFERENT FUEL TYPES

(71) Applicant: InstaFire, LLC, Ogden, UT (US)

(72) Inventors: Garold H. Williams, Logan, UT (US); Konel S. Banner, Ogden, UT (US)

(73) Assignee: INSTAFIRE, LLC, Ogden, UT (US)

( * ) Notice: Subject to any disclaimer, the term of this patent is extended or adjusted under 35 U.S.C. 154(b) by 551 days.

(21) Appl. No.: 17/580,373

(22) Filed: Jan. 20, 2022

(65) Prior Publication Data

US 2023/0225556 A1    Jul. 20, 2023

(51) Int. Cl.
| | |
|---|---|
| *A47J 37/06* | (2006.01) |
| *A47J 37/07* | (2006.01) |
| *F24B 1/02* | (2006.01) |
| *F24B 1/20* | (2006.01) |

(52) U.S. Cl.
CPC ....... *A47J 37/0658* (2013.01); *A47J 37/0763* (2013.01); *F24B 1/022* (2013.01); *F24B 1/202* (2013.01)

(58) Field of Classification Search
CPC ................ A47J 37/0763; A47J 37/0704; A47J 37/0658; A47J 37/0623; F24B 1/022; F24B 1/202; F24B 1/205; F24C 15/32; A21B 1/52

See application file for complete search history.

(56) References Cited

U.S. PATENT DOCUMENTS

| | | | |
|---|---|---|---|
| 5,752,497 A * | 5/1998 | Combs ................ | A47J 37/0704 126/25 R |
| 11,253,103 B2 * | 2/2022 | Stitt .................... | A47J 37/0763 |
| 11,767,980 B2 * | 9/2023 | Dean ........................ | F23N 3/08 126/77 |
| 2005/0139204 A1 | 6/2005 | Berti | |
| 2014/0326710 A1 | 11/2014 | Mckee et al. | |
| 2015/0201805 A1 | 7/2015 | Cedar et al. | |
| 2021/0121016 A1 | 4/2021 | Stitt et al. | |

FOREIGN PATENT DOCUMENTS

GB    393818 A    6/1933

OTHER PUBLICATIONS

International Preliminary Report on Patentability mailed Aug. 2, 2024 in International Application No. PCT/US23/11175, 10 pages.
International Search Report and Written Opinion mailed Jun. 6, 2023 in International Application No. PCT/US23/11175, 19 pages.

* cited by examiner

Primary Examiner — Ko-Wei Lin

(57) ABSTRACT

A heating device having a burn chamber that includes at least one opening, a conduction chamber adjacent to the burn chamber and including at least one aperture, a heat manifold including a first port and a second port, and at least one source vent extending between and coupling the first port of the heat manifold to the at least one opening of the burn chamber, and at least one exhaust vent, protruding from a surface of the heat manifold and extending between and coupling the second port of the heat manifold to the at least one aperture of the conduction chamber.

16 Claims, 6 Drawing Sheets

PORTABLE OVEN CONFIGURED FOR MULTIPLE DIFFERENT FUEL TYPES

TECHNICAL FIELD

The present disclosure relates to heating devices, and more particularly relates to a portable oven configure for multiple different fuel types.

BACKGROUND

There are two types of conventional portable ovens for outdoor use: a thermal container that is placed on a separate heating device with a fuel source, and a portable heating device housing a heating source and including one or more openings to exhaust smoke and debris. Thermal containers completely enclose the food item and include a swing door and metal rack for placing the food item between interior surfaces of the thermal container. Portable heating devices (e.g., BBQ grills, pizza ovens, etc.) have an interior surface for holding and/or using the heat source, the same interior surface or metal racks for holding the food item, and a lid, cover, or opening for exhausting smoke and debris. Although, conventional portable ovens may be transportable and can warm up food, establishing proper cooking times for various food items and weather conditions tends to be challenging and frustrating for users which limits users to cooking specific food items that can be properly cooked. For example, in thermal containers, the heating source and fuel source are detached from the oven which requires users to monitor the fuel source, the heating source, and the thermal container to ensure consistent cooking temperature in the thermal container. In portable heating devices, the fuel source and/or heating source is too close to the food item leaving users with a very narrow window of time for removing the food item before it gets burned or requiring users to constantly turn the food item to properly cook both sides of the food item. Thus, controlling heat flow, accounting for weather conditions (e.g., wind, rain, airflow, etc.) substantially arbitrary cooking times or establishing proper cooking times for various foods may be challenging using conventional portable ovens which often causes many users to experience loss of time and money from uncooked or overcooked food, and frustration from numerous attempts to establish proper cooking times for different food items and weather conditions.

Figure 1:
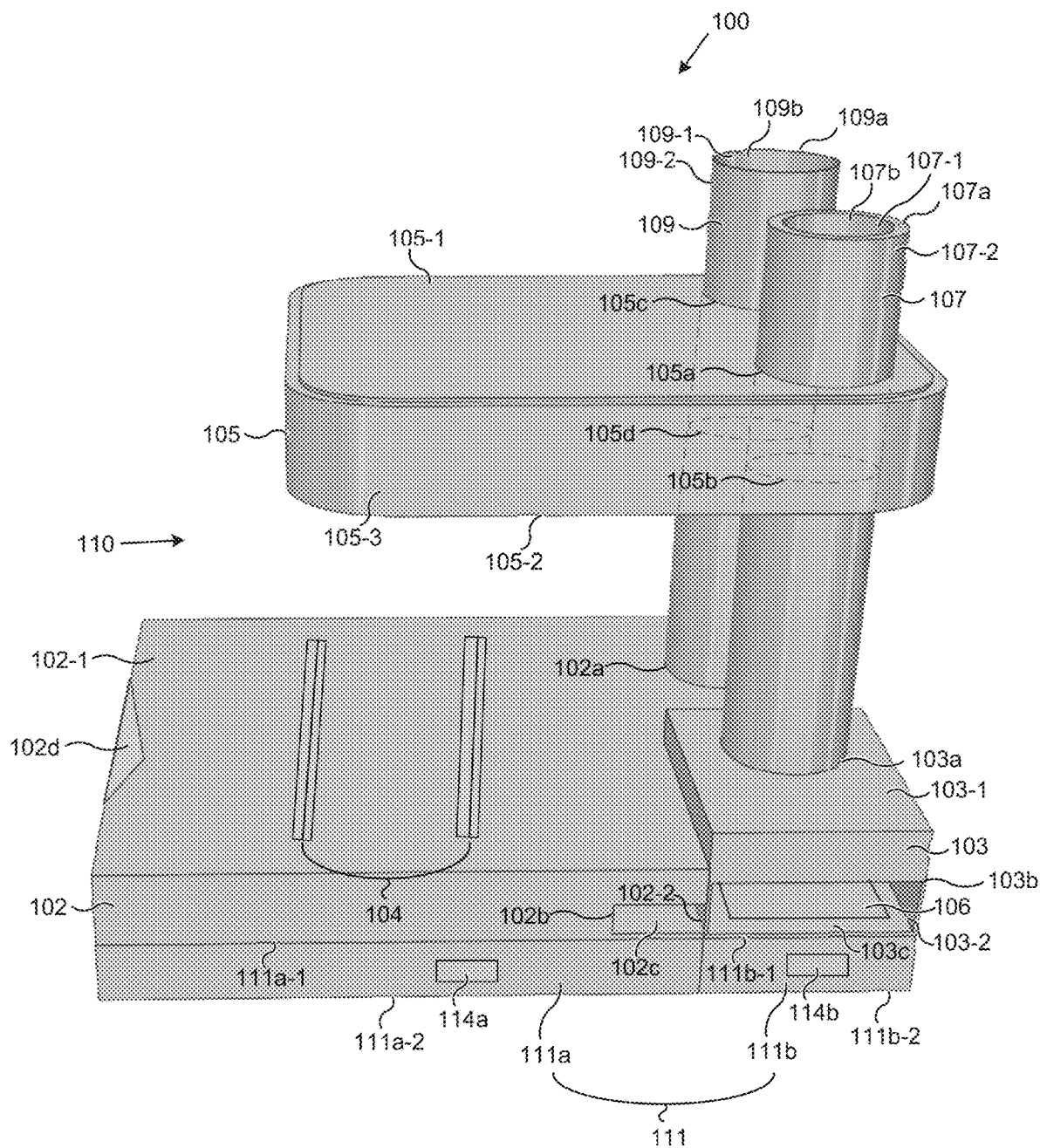
FIG. 1 is a left perspective view of an exemplary portable oven in accordance with an exemplary embodiment of the present disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

Specific details of several embodiments of portable ovens, and associated systems and methods, are described below. A person skilled in the relevant art will recognize that suitable stages of the methods described herein for making a heating device or portable oven can be performed using various equipment, materials, and design parameters as desired, as well as such constructing components in a manner to be easily assembled or disassembled by a user. Furthermore, unless the context indicates otherwise, structures disclosed herein can be formed using conventional equipment and/or fabrication techniques for building ovens, portable ovens, or heating devices. Ovens, portable ovens, heating devices, and materials and components thereof may be built, for example, using industrial and commercial as well as private or proprietary equipment.

In this disclosure, numerous specific details are discussed to provide a thorough and enabling description for embodiments of the present disclosure. One of ordinary skill in the art will recognize that the disclosure can be practiced without one or more of the specific details. Well-known structures and/or operations often associated with portable ovens may not be shown and/or may not be described in detail to avoid obscuring other aspects of the disclosure. In general, it should be understood that various other devices, systems, and/or methods in addition to those specific embodiments disclosed herein may be within the scope of the present disclosure.

The term "heating device" can refer to an assembly of one or more components, chambers, containers, plates, sliders, trays, racks, tubes, pipes, vents, exhausts, and/or manifolds, which may include interposers, supports, fixtures, and/or other suitable materials. The heating device may be manufactured as, but not limited to, as a unitary portable device, a collapsible, foldable, or otherwise dismountable device, and/or modular or compartmentalizable device. A heating device can include, for example, a fuel source, a heating mechanism, one or more spaces, compartments, or chambers, and one or more openings, vents, fans, heatsinks or exhausts. A heating device may further include non-planar surfaces, regular and irregular (e.g., non-polygonal) apertures, and removeable or moveable partitions within the one or more spaces, compartments, or chambers. A heating device may refer herein to an oven or portable oven, but heating devices are not limited to ovens or portable ovens.

The term "portable oven" can refer to an arrangement with one or more heating devices, systems, or mechanism incorporated into an enclosure or housing. The portable oven can include a housing or casing that partially or completely encapsulates at least one heating device, system, or mechanism.

As set forth above, conventional ovens cannot control heat flow and are susceptible to weather conditions which causes arbitrary cooking times, restricts users to cooking specific food items (e.g., thick or meaty foods), and requires users to monitor the fuel source, the heating source, and the food item to ensure consistent cooking temperatures. Embodiments of the present disclosure solve this challenge, and others, by providing a portable oven with separate chambers that direct air and heat flow onto various interior spaces and surfaces of the oven. The separate chambers allow the burning fuel source and air flow to constructively flow into and radiate the cooking space of the portable oven. In this manner, the portable oven of the present disclosure allows users to consistently cook various food items while inhibiting weather conditions from altering cooking times and cooking temperature.

FIG. 1 is a left perspective view of an exemplary portable oven in accordance with an exemplary embodiment of the present disclosure. As can be seen with reference to FIG. 1, an exemplary portable oven 100 may include one or more conduction chambers 102, burn chambers 103, heat chambers 105, source vents 107, exhaust vents 109, and slidable and/or removable ash trays 111a and 111b. The portable oven 100 includes heating space 110 on and/or between the interior surfaces of the conduction chamber 102, burn chamber 103, and heat chamber 105.

The exemplary conduction chamber 102 may have a regular polygon shape, for example, a rectangular, oval, or square box or cylinder. The surfaces, sides, corners, or edges of the conduction chamber 102 may be curved or non-linear to optimize heat and air flow within the conduction chamber 102. The conduction chamber 102 may be fixed to the portable oven 100. In some embodiments, the conduction chamber 102 may be removably coupled to the portable oven 100. The conduction chamber 102 may be adjacent to, or abut, one or more sides or surfaces of other chambers (e.g., heat chamber 105 or burn chamber 103), source vents 107, exhaust vents 109, or a combination thereof.

The conduction chamber 102 may include a plurality of apertures 102a, 102b, 102c and 102d (hereinafter "apertures 102n") to, for example, receive fuel or a fuel source, couple to fittings or components (e.g., exhaust vent 109), or direct heat, smoke, debris, or air (e.g., wind from the outside environment), or any combination thereof. In some embodiments, apertures 102n may be permanently open, for example, to receive a fuel source, exhaust smoke, or provide access to debris. In some embodiments, the conduction chamber 102 may include a slidable cover, swing door, or retractable cover to allow the apertures 102n to partially open or fully close to further direct heat, exhaust smoke and debris, or reduce weather conditions from altering heat flow, air flow, or cooking temperature.

Figure 3:
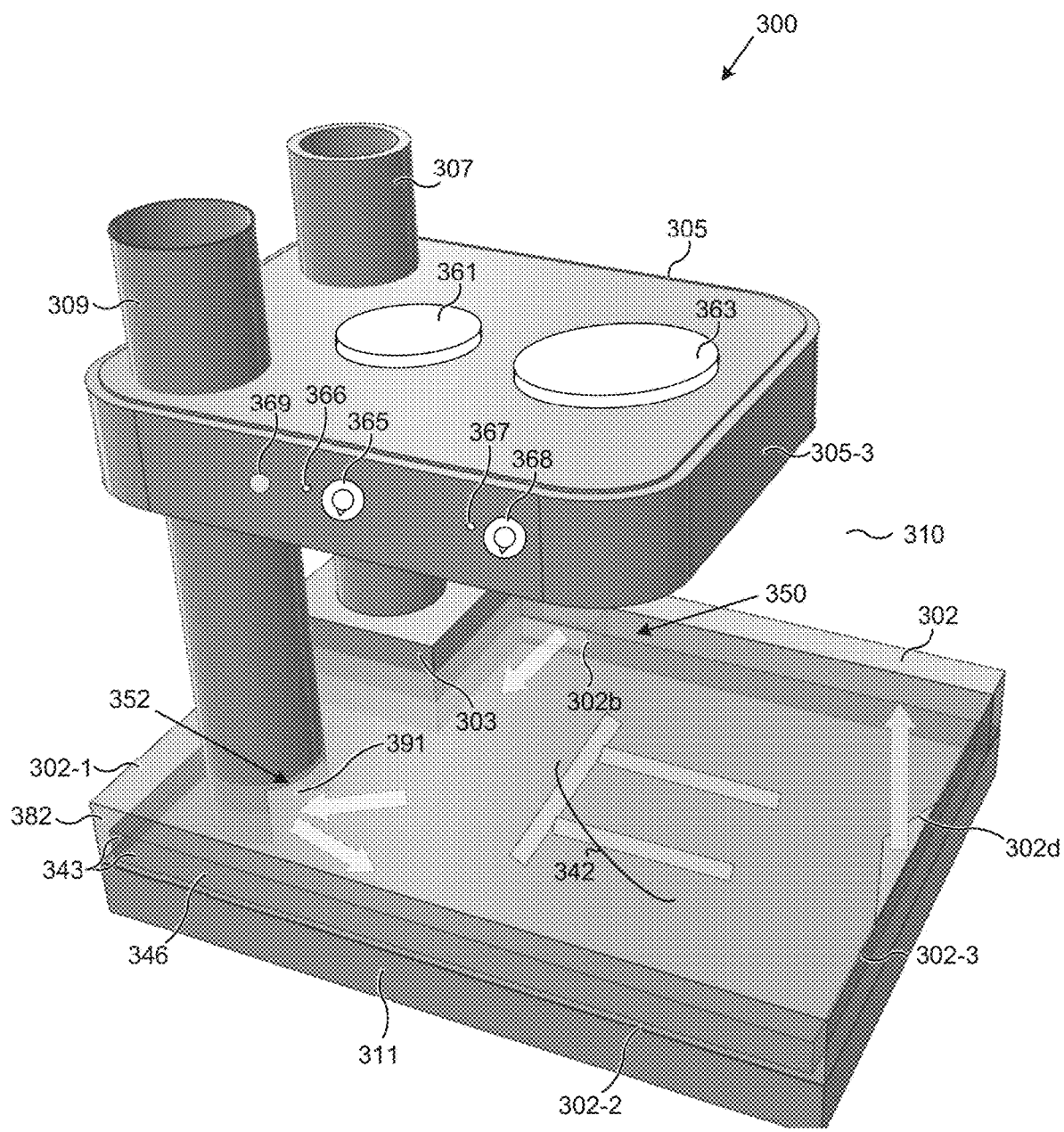
FIG. 3 is a right perspective view of an exemplary conduction chamber interior of an exemplary portable oven in accordance with an exemplary embodiment of the present disclosure.

Food items may be placed on an upper surface 102-1 of the conduction chamber 102. In some embodiments, the upper surface 102-1 may include a plurality of protrusions 104 to direct radiated heat or separate food items. In some embodiments, the upper surface 102-1 may include one or more apertures 102n to drain excess fluid, oil, or other cooking byproducts. Further, in some embodiments one or more apertures 102n may be adjacent to the one or more protrusions 104. Further, in some embodiments, one or more interior spaces of the conduction chamber 102 may include interior protrusions 342 (as shown in FIG. 3) along the lower surface 102-2 of the conduction chamber 102 that partition the interior spaces to, for example, direct heat and air flow and radiate heat to the upper surface 102-1 and/or drain excess fluid or oil from the upper surface 102-1.

In some embodiments, the conduction chamber 102 may be fixed or positioned directly above ash tray 111a such that the lower surface 102-2 of the conduction chamber 102 and the upper surface 111a-1 of the ash tray 111a are shared, that is, the conduction chamber 102 and the ash tray 111a are attached together by the same barrier or surface. Further, in this embodiment, the conduction chamber 102 may include one or more apertures 102c that extend through and partially across the interior surface of the lower surface 102-2 of the conduction chamber 102, such that, for example, a fuel source, heat, or drained fluid moves from between the interior surface of the lower surface 102-2 of the conduction chamber 102 and the interior surface of the lower surface 111a-2 of the ash tray 111a. In some embodiments, one or more apertures 102n may be recesses that extend laterally across the upper surface 102 to, for example, collect excess fluid or oil from the upper surface 102-1. In some embodiments, the one or more apertures 102n may be configured to direct or collimate radiated heat from the interior space of the conduction chamber 102 into a space. In some embodiments, the aperture 102c may extend through and completely or substantially across the interior surface of the lower surface 102-2 of the conduction chamber 102, such that the conduction chamber 102 excludes a lower surface 102-2 and the interior space of the conduction chamber 102 is bounded by the upper surface 102-1 of the conduction chamber 102 and the interior lower surface 111a-2 of the ash tray 111a.

Moreover, in some embodiments the conduction chamber 102 may provide users with an auxiliary burn chamber for adding additional fuel and heat to the portable oven 100, as well as providing a compartment to burn wood chips, wood pellets, charcoal, wood chunks or the like to infuse flavor and enhance the taste of the food item.

The exemplary burn chamber 103 may have a regular polygon shape, for example, a rectangular, oval, or square box or cylinder. The surfaces, sides, corners, or edges of the burn chamber 103 may be curved or non-linear to optimize heat and air flow within the burn chamber 103. The burn chamber 103 may be fixed to the portable oven 100. In some embodiments, the burn chamber 103 may be removably coupled to the portable oven 100. The burn chamber 103 may be adjacent to, or abut, one or more sides or surfaces of other chambers (e.g., conduction chamber 102 or heat chamber 105), source vents 107, exhaust vents 109, or a combination thereof.

The burn chamber 103 may include a plurality of openings 103a, 103b, and 103c (hereinafter "openings 103n") to, for example, receive fuel or a fuel source, couple to fittings or components (e.g., source vent 107), or direct heat, smoke, debris, or air (e.g., wind from the outside environment), or any combination thereof. In some embodiments, openings 103n may be permanently open, for example, to receive a fuel source, exhaust smoke, or provide access to debris. In some embodiments, the burn chamber 103 may include a slidable cover, swing door, or retractable cover to allow the openings 103n to partially open or fully close to further direct heat, exhaust smoke and debris, or reduce weather conditions from altering heat flow, air flow, or cooking temperature.

In some embodiments, the interior lower surface 103-2 of the burn chamber 103 may include one or more recesses 106 that partitioning the interior spaces of the burn chamber 103 to, for example, protect the fuel source or heat from environmental conditions, protect users from embers, smoke or debris, to prevent fuel source from sliding, shifting or falling out of the burn chamber 103, or prevent fuel source from and/or direct heat and air flow through the source vent 107, or any combination thereof.

In some embodiments, the burn chamber 103 may be fixed or positioned directly above ash tray 111*b* such that the lower surface 103-2 of the burn chamber 103 and the upper surface 111*b*-1 of the ash tray 111*b* are shared, that is, the burn chamber 103 and the ash tray 111*b* are attached together by the same barrier or surface. Further, in this embodiment, the burn chamber 103 may include one or more apertures 103*c* that extend partially across the interior lower surface 103-2 of the burn chamber 103, such that, for example, a fuel source or heat may be directed between the interior lower surface 103-2 of the burn chamber 103 and the interior lower surface 111*b*-2 of the ash tray 111*b*. In some embodiments, the aperture 103*c* may extend through and completely or substantially across the interior surface of the lower surface 103-2 of the burn chamber 103, such that the burn chamber 103 excludes a lower surface 103-2 and the interior space of the burn chamber 103 is bounded by the upper surface 103-1 of the burn chamber 103 and the interior lower surface 111*b*-2 of the ash tray 111*b*.

In some embodiments, the dimensions of the burn chamber 103 may be configured such at least a portion of the upper surface 103-1 of the burn chamber 103 is flush with the upper surface 102-1 to provide more surface area for food items. In some embodiments, the upper surface 103-1 of the burn chamber 103 may be configured to be completely flush with the upper surface 102-1 of the conduction chamber 102 such that the portable oven 100 has the maximum cooking surface area for food items.

The exemplary heat chamber 105 may have a regular polygon shape, for example, a rectangular, oval, or square box or cylinder. The surfaces, sides, corners, or edges of the heat chamber 105 may be curved or non-linear to optimize heat and air flow within the heat chamber 105. The heat chamber 105 may be fixed to the portable oven 100. In some embodiments, the heat chamber 105 may be movably or removably coupled to the portable oven 100. The heat chamber 105 may be adjacent to, or abut, one or more sides or surfaces of other chambers (e.g., conduction chamber 102 or heat chamber 105), source vents 107, exhaust vents 109, or a combination thereof.

The heat chamber 105 may include a plurality of ports 105*a*, 105*b*, 105*c*, and 105*d* (hereinafter "ports 105*n*") to, for example, couple to one or more fittings or components (e.g., source vent 107 and exhaust vent 109), to direct heat, smoke, debris, or air (e.g., wind from the outside environment), or any combination thereof. In some embodiments, ports 105*n* may be permanently open, for example, to direct heat and air, exhaust smoke, or provide access to debris. In some embodiments, the heat chamber 105 may include a slidable cover, a flap, a swing door, or retractable cover to allow the ports 105*n* to partially open or fully close to further direct heat, exhaust smoke and debris, or reduce weather conditions from altering heat flow, air flow, or cooking temperature.

Figure 2A:
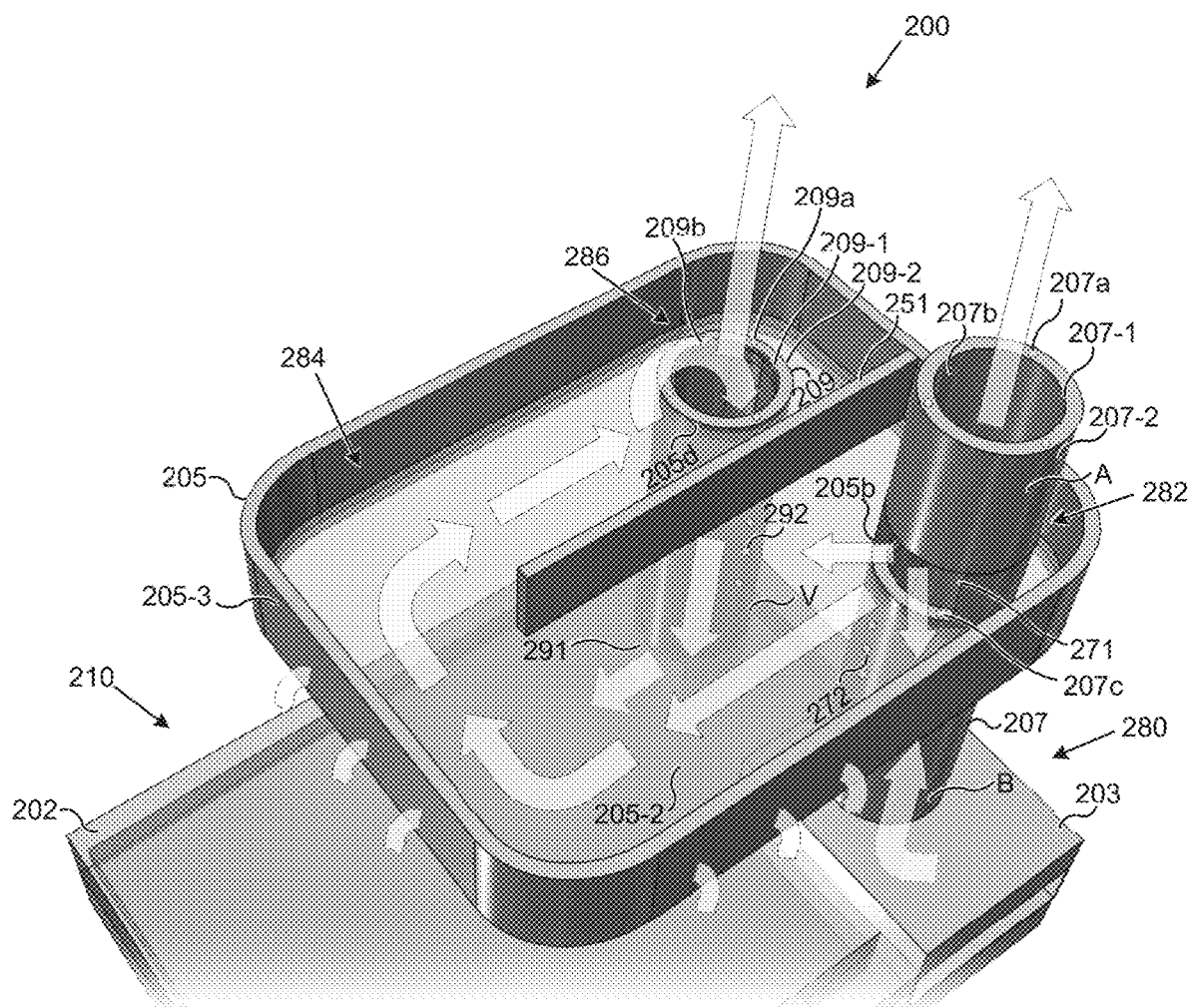
FIG. 2A is top perspective view of heat flow through an exemplary heat chamber interior of an exemplary portable oven in accordance with an exemplary embodiment of the present disclosure.
Figure 2B:
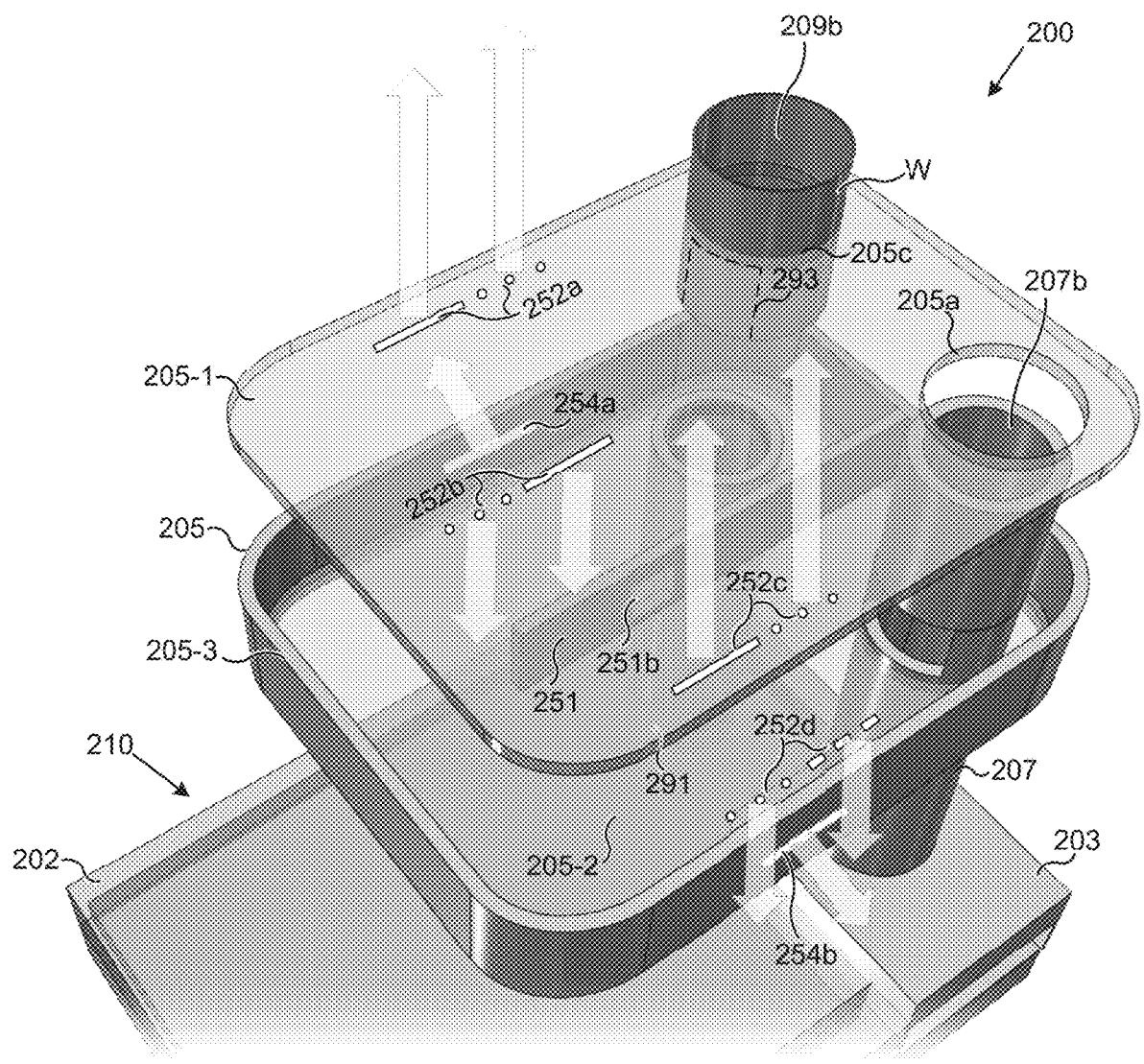
FIG. 2B is top perspective view of an exemplary heat chamber interior and heat chamber cover of an exemplary portable oven in accordance with an exemplary embodiment of the present disclosure.

As will be further discussed in FIGS. 2A-2B, in some embodiments, the heat chamber 105 may include one or more partitions 251 separating interior spaces of the heat chamber 105 to, for example, direct heat and air flow through the heat chamber 105 to exhaust vent 109.

In some embodiments, the heat chamber 105 may include one or more openings 108 that extend partially across the interior lower surface 105-2 of the heat chamber 105, such that, for example, a portion of heat flow may be direct from below the lower surface 105-2 into heating space 110. In some embodiments, the openings 108 may extend along one or more edges, sides, or surfaces of the heat chamber 105, such that heat may be circulated back into the portable oven 100.

In some embodiments, the dimensions of the heat chamber 105 may be configured such that at least the lower surface 105-2 of the heat chamber 105 substantially overlays the total area of the upper surface 102-1 of the conduction chamber 102 thereby confining heat flow between the lower surface 105-2 of the heat chamber 105 and the upper surface 102-1 of the conduction chamber 102. Moreover, in some embodiments, the dimensions of the heat chamber 105 may be configured such that one or more sides, portions, or edges of the exterior peripheral surface(s) 105-3 of the heat chamber 105 contacts one or more sides, portions or edges of an interior surface of one or more peripheral surfaces 500-1, 500-2, 500-3 and 500-4 of the portable oven 500.

Referring to FIGS. 1 and 2A for the exemplary source vent 107 and exhaust vent 109. The exemplary source vent 107 extends between the heat chamber 105 and burn chamber 103 to direct heat, air, smoke and debris away from the burn chamber 103. The source vent 107 may comprise a single piece extending between the burn chamber 103 and heat chamber 105, or a plurality of segments where each segment couples to one of the openings 103*n* of the burn chamber 103 and ports 105*n* of the heat chamber 105. Moreover, source vent 107 may further protrude from upper surface 105-1 and port 105*a* of heat chamber 105. The source vent 107 need not be limited to a cylinder as shown and described, and instead may be rectangular, oval, trapezoidal, or other polygonal shape. Each of the one or more segments of the source vent 107 may have the same or different shape, the same or different thickness (e.g., the same or different inner and outer surfaces, where the inner surface is a first distance from the centerline of the vent segment and the outer surface is a second distance from the centerline that extends vertically along the center of vent segment), and the same or different size and dimensions.

In some embodiments, the source vent 107 may include one or more cut-outs 271 to direct heat flow from burn chamber 103 into heat chamber 105. Similarly, the source vent 107 may include one or more openings 272 between the burn chamber 103 and heat chamber 105 to direct heat into heating space 110. Moreover, the opening 107*b* of the source vent 107 may have a predetermined thickness 107-1 (e.g., an inner surface) to reduce heat loss. In some embodiments, the inner surface may include apertures 107*a* extending vertically through the top and bottom ends of the source vent 107 to channel or circulate air or heat within the portable oven 100. Further, the inner surface 107-1 and outer surface 107-2 of the source vent 107 may each have separate openings 272 to channel heat, air, smoke or debris through the source vent 107. For example, to direct heat and air into the portable oven 100 and heat chamber 105, the source vent 107 may include openings 272 in only the outer surface 107-2, apertures 107*a* between inner and outer surfaces 107-1, 107-2, and cut-outs 271 that extend through both inner and outer surfaces 107-1, 107-2.

The exemplary exhaust vent 109 extends between the heat chamber 105 and conduction chamber 102 to direct heat, air, smoke and debris away from the conduction chamber 102. The exhaust vent 109 may comprise a single piece extending between the conduction chamber 102 and heat chamber 105, or a plurality of segments where each segment couples to one of the openings 102*n* of the conduction chamber 102 and ports 105*n* of the heat chamber 105. Moreover, exhaust vent 109 may further protrude from upper surface 105-1 and port 105*c* of heat chamber 105. The exhaust vent 109 need not be limited to a cylinder as shown and described, and instead may be rectangular, oval, trapezoidal, or other polygonal shape. Each of the one or more segments of the exhaust vent 109 may have the same or different shape, the same or different thickness (e.g., the same or different inner and outer surfaces, where the inner surface is a third distance from the centerline of the vent segment and the outer surface is a fourth distance from the centerline that extends vertically along the center of the vent segment), and the same or different size and dimensions. In some embodiments, the first, second, third and fourth distances may be the same or different.

In some embodiments, the exhaust vent 109 may include one or more cut-outs 291 to direct heat flow from conduction chamber 102 into heat chamber 105, and vice versa. Similarly, the exhaust vent 109 may include one or more openings 292 between the conduction chamber 102 and heat chamber 105 to direct heat into heating space 110. Moreover, the opening 109b of the exhaust vent 109 may have a predetermined thickness 109-1 (i.e., includes inner and outer surfaces) to reduce heat loss. In some embodiments, the inner surface may include apertures 109a extending vertically through the top and bottom ends of the exhaust vent 109 to channel or circulate air or heat within the portable oven 100. Further, the inner surface 109-1 and outer surface 109-2 of the exhaust vent 109 may each have separate openings 292 to channel heat, air, smoke or debris through the exhaust vent 109. For example, to direct heat and air into the portable oven 100 and heat chamber 105, the exhaust vent 109 may include openings 292 in only the outer surface 109-2, apertures 109a between inner and outer surfaces 109-1, 109-2, and cut-outs 291 that extend through both inner and outer surfaces 109-1, 109-2.

The exemplary ash tray 111 may comprises of individual ash trays 111a and 111b that slide out from the portable oven 100. Each ash tray 111a and 111b may be slidably and/or removably positioned below the conduction chamber 102 and burn chamber 103, respectively. As described above, in some embodiments, the upper surface 103-1 of the burn chamber 103 and the lower surface 111b-2 of the ash tray 111b may form the interior space of the burn chamber 103. That is, the burn chamber 103 and ash tray 111b do not share a barrier or surface. In such embodiments, the ash tray 111b may have sliders 121 that partition, bound, and isolate the interior space of the burn chamber 103 from the rest of the portable oven 100. In such embodiments, the ash tray 111b serves to both bound the interior space of the burn chamber 103 and to provide access for removing used fuel (e.g., charcoal, wood, etc.).

Similarly, as described above, in some embodiments, the upper surface 102-1 of the conduction chamber 102 and the lower surface 111a-2 of the ash tray 111a may form the interior space of the conduction chamber 102. That is, the conduction chamber 102 and ash tray 111a do not share a barrier or surface. In such embodiments, the ash tray 111a may have sliders 121 that partition, bound, and isolate the interior space of the conduction chamber 102 from the rest of the portable oven 100. In such embodiments, the ash tray 111a serves to both bound the interior space of the conduction chamber 102 and to provide access for removing used fuel (e.g., charcoal, wood, etc.). One or more ash trays 111a, 111b may include an opening feature 114a, 114b such as a handle, hook, or aperture that can be pulled, pressed, latched or hooked onto, for example, by an end of a brush, cooking tool, or other tool to slide out and open the ash tray 111a and 111b.

FIG. 2A is top perspective view of heat flow through an exemplary heat chamber interior of an exemplary portable oven in accordance with an exemplary embodiment of the present disclosure. As can be seen with reference to FIG. 2A, an exemplary heat chamber 205 may include a plurality of ports 205n and one or more partitions 251 separating interior spaces of the heat chamber 205 to, for example, direct heat and air flow through the interior spaces of the heat chamber 105 and to exhaust vent 209. The heat chamber 105 may have a regular polygon shape, for example, a curved rectangular box. The interior and exterior surfaces of the one or more partitions 251, ports 205n, upper surface 205-1, lower surface 205-2, and peripheral surface 205-3 of the heat chamber 105 may be, in part or in whole, coarse, smooth, textured, dimpled, flat, curved or rounded. Thus, the interior surfaces, sides, corners, or edges of the heat chamber 105 may be configured as stated above or as desired to optimize heat and air flow within heat chamber 105.

The partition 251 need not be limited to one partition (i.e., one wall) as shown and described, and instead the partition 251 may include one or more segments. Each partition 251 segment may be of the same or different shape. For example, square, rectangular, oval, trapezoidal, or other polygonal shaped partitions or protrusions may be used as partition 251 in the interior of the heat chamber 105. Each of the one or more segments of the partition 251 may have the same or different thickness, and the same or different size and dimensions.

As shown, heat flows from burn chamber 203 through source vent 207 into heat chamber 205 and out of exhaust vent 209. As will be further described in FIG. 2B, one or more chambers (e.g., upper, lower and peripheral surfaces 205-1, 205-2, and 205-3 of heat chamber 205) and/or vents may include one or more openings, apertures, or ports to further guide heat and/or air flow as desired, as well as to direct additional and/or excess heat into heating space 210. Heat flow within the portable oven 200 may be described as occurring through a plurality of stages 280, 282, 284 and 286.

In stage 280, a fuel source (e.g., biofuel, sterno canned heat, gas, coal, etc.) and/or heating source (e.g., fire, propane and/or electric stove or ignitor, etc.) may be placed or installed in burn chamber 203 and used (e.g., burning biofuel) to produce heat. Upon use of the fuel source, heat, air, smoke, gas, embers, debris, and other byproducts of the spent fuel may radiate and flow from within burn chamber 203 into one or more source vents 207. The source vent 207 may be fixed or removably coupled to port 205b of the heat chamber 205. The source vent 207 may portion out, for example, flowing, radiated or emanating heat, air, smoke, and other byproducts of the used fuel source into one or more portions. The source vent 207 may include one or more apertures 207a, 207c, and openings 207 formed between top and bottom ends, inner surface 207-1, and outer surface 207-2 of the source vent 207.

In some embodiments, one or more apertures 207a may direct, for example, a portion of heat and air flow into heating space 210 through one or more openings 272.

Still, in some embodiments, one or more apertures 207c may extend through a lower surface of the cut-out 271 and the surface of the bottom end of the source vent 270 to direct, for example, a portion of heat and air flow from burn chamber 203 into the heat chamber 205.

Moreover, in some embodiments, one or more apertures 207a may extend through the top and bottom ends of the source vent 207 such that a portion of heat and air flowing into one or more apertures 207a from the bottom end of the source vent 207 may flow between the inner and outer surfaces 207-1, 207-2 of the source vent 207 and out from one or more apertures 207a on the top end of the source vent 207.

In stage 282, another portion of heat and air may flow from burn chamber 203 into opening 207b of source vent 207 and out from cut out 271 of source vent 207 into heat chamber 203. In some embodiments, the source vent 207 may have one or more segments A, B, C . . . etc. In some embodiments, source vent 207 may include one or more slidable covers, flaps, swing doors, retractable covers, screens, or other covers or partitions at, or between, each end of the source vent 207 to, for example, capture or prevent byproducts and debris from entering heat chamber 205 and/or prevent embers from escaping the portable oven 200 into the environment (e.g., the camp site, forest, etc.). In some embodiments, source vent 207 may include one or more slidable covers, flaps, swing doors, retractable covers, screens, or other covers or partitions positioned between each end of the source vent 207 that fully open, partially open, or fully closed during use of the portable oven 200 to further guide heat and air flow into heat chamber 205 or out of the portable oven 200 through source vent 207. Still, another portion of heat and air may flow within source vent 207 and out from the top surface or top end of the source vent 207.

In stage 284, heat and air flow within the interior space of heat chamber 205. The heat chamber 205 may be bounded by the upper, lower and peripheral interior surfaces 205-1, 205-2, 205-3, and one or more partitions 251 of a predetermined length, width and thickness. In some embodiments, one or more partitions 251 may extend substantially widthwise, for example, across the width of the heat chamber 205 thereby forming one or more separate but adjoining interior spaces within the heat chamber 205. In some embodiments, one or more partitions 251 may extend substantially lengthwise, vertically, or any combination thereof. In some embodiments, one or more partitions 251 may be fixed to, removable coupled to, or slidably inserted in, the interior side of the peripheral surface 205-3. In some embodiments, one or more partitions 251 may be fixed to, removable coupled to, or slidably inserted in, the interior side of the top surface 205-1 of the heat chamber 205. In some embodiments, one or more partitions 251 may be fixed to, removable coupled to, or slidably inserted in, the interior side of the bottom surface 205-2 of the heat chamber 205.

Heat flowing within heat chamber 205 may radiate from the sides, edges and surfaces of the upper, lower and peripheral interior surfaces 205-1, 205-2, 205-3 out into heating space 210. Moreover, air flowing within heat chamber 205 may direct heat to flow along and between the one or more partitions 251 and interior surfaces of the peripheral surface 205-3. Thus, one or more portions of heat flowing within heat chamber 205 may radiate from the upper, lower and peripheral interior surfaces 205-1, 205-2, 205-3 out into heating space 210, and one or more portions of heat flowing with heat chamber 205 may flow from the source vent 207 to the exhaust vent 209.

In stage 286, heat and air within the interior space of heat chamber 205 flow out from one or more ports 205c and 205d and into the exhaust vent 209. In some embodiments, the exhaust vent 209 may have one or more segments V, W, X . . . etc.

In some embodiments, exhaust vent 209 may include one or more slidable covers, flaps, swing doors, retractable covers, screens, or other covers or partitions at, or between, each end of the exhaust vent 209 to, for example, capture or prevent byproducts and debris from entering the conduction chamber 202 and/or prevent embers from escaping the portable oven 200 into the environment (e.g., the camp site, forest, etc.). In some embodiments, exhaust vent 209 may include one or more slidable covers, flaps, swing doors, retractable covers, screens, or other covers or partitions positioned between each end of the exhaust vent 209 that fully open, partially open, or fully closed during use of the portable oven 200 to further guide heat and air flow from the heat chamber 205 out to the conduction chamber 202 and/or out of the portable oven 200 into the environment.

As described above, the exhaust vent 209 may include two segments; a first segment V with cutout 291 coupled between the heat chamber 205 and conduction chamber 202, and a second segment W spaced from the first segment V and attached to port 205c of the heat chamber 205. Although a gap is provided between the two segments V, W of exhaust vent 209, in some embodiments, the exhaust vent 209 may be one segment with an upper cutout 293 to direct heat and air flow into the conduction chamber 202 and out from the portable oven 200 into the environment.

The exhaust vent 209 may circulate heat and air into the heating space 210 and into the interior of the conduction chamber 202 where food items are placed for cooking. In some embodiments, a portion of heat and air may flow from the heat chamber 205 into the interior of conduction chamber 202 through cutout 291. In some embodiments, a portion of heat and air may flow out from the portable oven through the exhaust vent 209. In some embodiments, a portion of heat and air may flow into the heating space 210 through openings 292.

FIG. 2B is top perspective view of an exemplary heat chamber interior and heat chamber cover of an exemplary portable oven in accordance with an exemplary embodiment of the present disclosure. As can be seen with reference to FIG. 2B, exemplary exterior surfaces of the heating chamber 205 may include one or more apertures 252a, 252b, 252c, 252d, 254a and 254b extending through and along one or more upper, lower and peripheral surfaces 205-1, 205-2, and 205-3. In some embodiments, a portion of heat and air may flow into the heating space 210 through openings 292. In some embodiments, the heat chamber 205 may include one or more apertures 252a, 252b, 252c, 252d, 254a and 254b extending through and along one or more upper, lower and peripheral interior surfaces 205-1, 205-2, and 205-3 to direct, for example, a portion of heat and air flow into heating space 210. In some embodiments, the exhaust vent 209 may be formed of one segment with two cutouts 291 and 293. The lower cutout 291 directing a portion of heat and airflow from the upper cutout 293 into the conduction chamber 202, and the upper cutout 293 directing a portion of heat and airflow out from the portable oven 200 and into the environment. In some embodiments, the exhaust vent 209 may include two segments V, W and each segment have one or more cutouts 291, and 293, respectively.

In some embodiments, opening 209b of the exhaust vent 209 may have a predetermined thickness 209-1 (i.e., includes inner and outer surfaces) to reduce heat loss. Moreover, each segment V, W, . . . etc., of the exhaust vent 209 may have the same or different thickness or inner surface. Further, the cutouts 291 and 293 may be of the same or different shape to reduce heat loss and further direct heat and air flow into the heating space 210 and out from the portable oven 200 into the environment. The shape of the cutouts 291 and 293 may be, for example, square, rectangular, oval, trapezoidal, or other polygonal shaped cutouts.

Moreover, each of the cutouts 291 and 293 may have the same or different thickness, and the same or different size and dimensions.

In some embodiments, opening 207b of the source vent 207 may have a predetermined thickness 207-1 (i.e., includes inner and outer surfaces) to reduce heat loss. Moreover, each segment A, B, . . . etc., of the source vent 207 may have the same or different thickness or inner surface. Further, one or more the cutouts 271 may be of the same or different shape to reduce heat loss and further direct heat and air flow into the heat chamber 205 and heating space 210, and out from the portable oven 200 into the environment. The shape of the one or more cutouts 271 may be, for example, square, rectangular, oval, trapezoidal, or other polygonal shaped cutouts. Moreover, each of the cutouts 271 may have the same or different thickness, and the same or different size and dimensions.

In some embodiments, one or more partitions 251 of the heat chamber 205 may include one or more openings 251b to, for example, direct heat and airflow within the heat chamber 205. The shape of the one or more openings 251b may be, for example, square, rectangular, oval, trapezoidal, or other polygonal shaped cutouts. Moreover, each of the openings 251b may have the same or different size and dimensions.

FIG. 3 is a right perspective view of an exemplary conduction chamber interior of an exemplary portable oven in accordance with an exemplary embodiment of the present disclosure. As can be seen with reference to FIG. 3, an exemplary conduction chamber 302 may a include top, bottom, and peripheral surfaces 302-1, 302-2 and 303-3, respectively. The top surface 302-2 may be a cooking surface for food items. In some embodiments, the conduction chamber 302 may include one interior space bounded by the top, bottom, and peripheral surfaces 302-1, 302-2 and 303-3, respectively. In some embodiments, the conduction chamber 302 may include one or more partitions 342 and/or walls 343 that partition the interior space of the conduction chamber 302 into a plurality of interior spaces. One or more partitions 342 may be formed on either interior space 346, that is, adjacent to the bottom surface 302-2, or on interior space 382, that is adjacent to top surface 302-1. For example, interior space 346 may be formed by a plurality of walls 343 extending along, but not contacting, the perimeter of each peripheral surface 302-3 of the conduction chamber 302. The interior space 346 may restrict heat and air flow from the cutout 391 of the exhaust vent 309 to within certain regions of the conduction chamber 302. For example, partitions 342 and/or walls 343 may be configured such that higher surface heat areas on the conduction surface 302-1 are formed by constraining heat and air flow between the cutout 391 and the leftmost wall of the partition 342. Subsequently, the adjoining interior space 382 may provide lower surface heat areas on the conduction surface 302-1, for example, near opening 302d where heat and air flow are reduced through one or more partitions 342. Thus, food items requiring longer cooking times may be placed on or near portions of the conduction surface 302-1 configured to receive greater surface heat.

The conduction chamber 302 may have a regular polygon shape, for example, a curved rectangular box. The interior and exterior surfaces of the one or more partitions 342, walls 343, apertures 302a, 302b, 302c, top surface 302-1, bottom surface 302-2, and peripheral surface 302-3 of the conduction chamber 302 may be, in part or in whole, coarse, smooth, textured, dimpled, flat, curved or rounded. Thus, the interior surfaces, sides, corners, or edges of the conduction chamber 302 may be configured as stated above or as desired to optimize heat and air flow within burn chamber 302.

The partition 342 need not be limited to one partition (i.e., one wall) as shown and described, and instead the partition 342 may include one or more segments. Each partition 342 segment may be of the same or different shape. For example, square, rectangular, oval, trapezoidal, or other polygonal shaped partitions or protrusions may be used as partition 342 in the interior of the conduction chamber 302. Each of the one or more segments of the partition 342 may have the same or different thickness, and the same or different size and dimensions.

As shown, heat flows into and out from the conduction chamber 302 through exhaust vent 309. Moreover, like stage 280 of the burn chamber 203 above, heat can also be generated using a fuel source and/or heating source placed or installed in conduction chamber 302. Heat flow within the portable oven 300 may be described as occurring through a plurality of stages 350 and 352.

In stage 350, a fuel source (e.g., biofuel, sterno canned heat, gas, coal, etc.) and/or heating source (e.g., fire, propane and/or electric stove or ignitor, etc.) may be placed or installed in conduction chamber 302 and used (e.g., burning biofuel) to produce heat. Upon use of the fuel source, heat, air, smoke, gas, embers, debris, and other byproducts of the spent fuel may radiate and flow from within conduction chamber 302 into one or more exhaust vents 309. The exhaust vent 309 may be fixed or removably coupled to aperture 102a of the burn chamber 302. The exhaust vent 309 may portion out, for example, flowing, radiated or emanating heat, air, smoke, and other byproducts of the used fuel source into one or more portions. The conduction chamber 302 may include one or more apertures 302d for heat to flow or radiate into heating space 310.

In stage 352, a portion of heat and air may flow from heat chamber 305 into the conduction chamber 302 from exhaust vent 309, and a portion of heat and air may flow from the conduction chamber 302 into the exhaust vent 309. The heat chamber 305 and conduction chamber 302 together provide heat and airflow within the heating space 310. The conduction chamber 302 may further provide an additional fuel or heating source to cook food items. Food items may be placed on an upper surface 302-1 of the conduction chamber 302 where heat may flow and radiate into the heating space 310 from heat chamber 305, conduction chamber 302, and source vent 307 and exhaust vent 309.

In some embodiments, the exemplary portable oven 300 may include one or more hot plates 361 and 363, hot plate controls 365 and 367, indicators 366 and 367, and power on/off switch 369. The hot plates 361 and 363 may be used as a warming plate for cooked food items or as a stove top for heating food items. In some embodiments, the one or more hot plates 361 and 363 may be incorporated into the body of the heat chamber 305 where the hot plate controls 365 and 367 may close or partially close one or more segments of exhaust vent 309, source vent 307, or opening 251b, or any combination thereof to direct heat flow to radiate from the one or more hot plates 361 and 363. In some embodiments, one or more hot plates 361 and 363 may be formed on, or attached onto, the heat chamber 305 where a separate power source and/or fuel source, for example electrical power, together with the power switch 369 and hot plate controls 365 and 367 may be used to operate hot plates 361 and 363. In some embodiments, one or more segments of exhaust vent 309, source vent 307, or openings 252a, 252c, 254a, 254b, or any combination thereof may be closed or partially closed by the hot plate controls 365 and 367 to direct heat flow underneath one or more hot plates 361 and 363.

Examples of material which could be used in the making the conduction chamber 302, burn chamber 303, heat chamber 305, source vent 307, exhaust vent 309 and ash tray 311 may include, for example, one of aluminum, aluminum alloy, steel, stainless steel, zinc, magnesium, cast iron, ceramic, or any other metals, corrosion resistant metals such as titanium, copper, bronze or brass, precious metals, or metal alloy, or a combination thereof.

Figure 4:
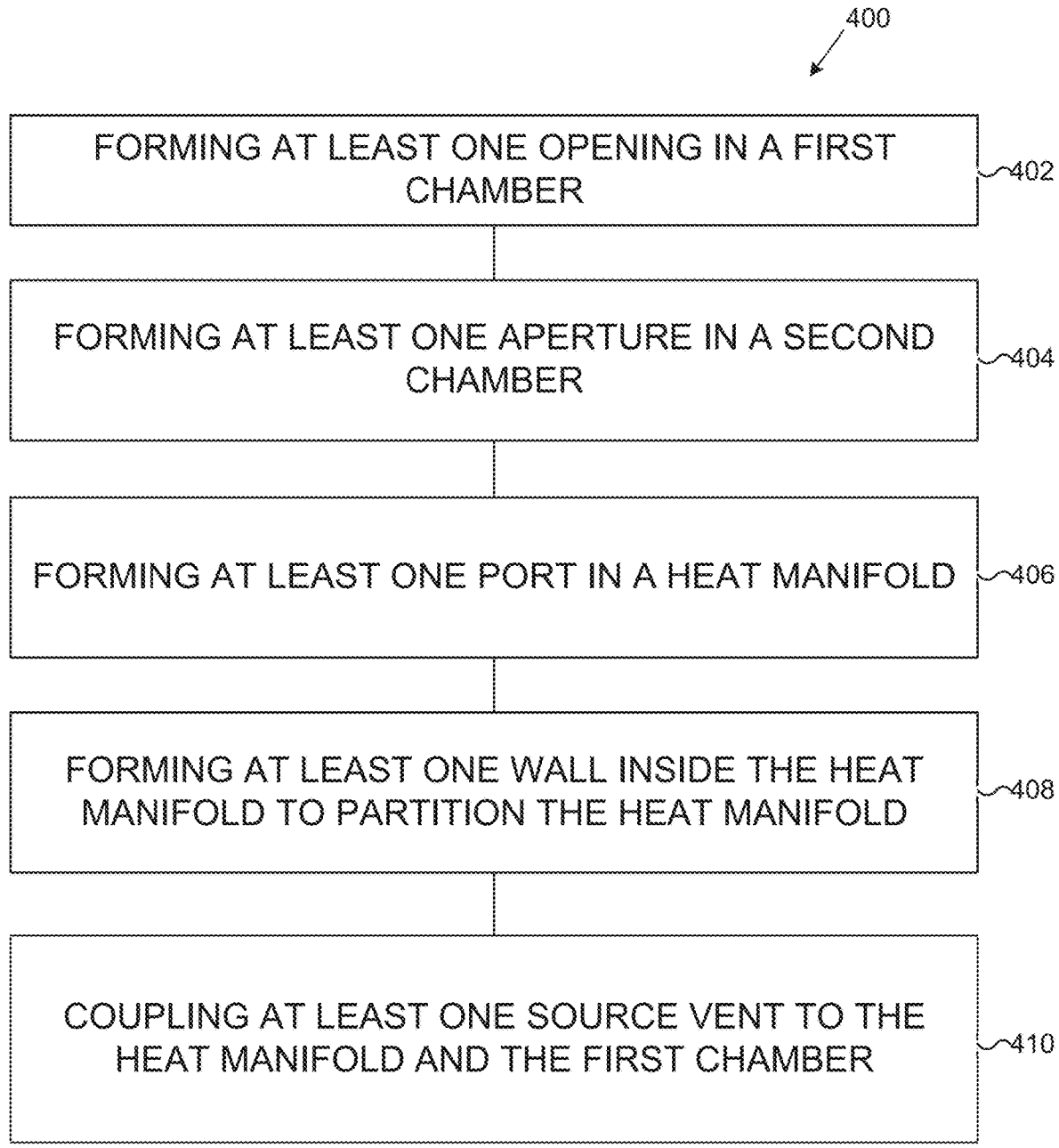
FIG. 4 is a flow chart illustrating an exemplary method of making the portable oven in accordance with an exemplary embodiment of the present disclosure.

FIG. 4 is a flow chart illustrating an exemplary method of making the portable oven in accordance with an exemplary embodiment of the present disclosure. The exemplary method is provided by way of example, as there are a variety of ways to carry out the method. Each box shown in FIG. 4 represents one or more processes, methods or subroutines, carried out in the exemplary method. FIGS. 1, 2A-2B, 3 and 5 show exemplary embodiments of carrying out the method of FIG. 4. The exemplary method may begin at box 402. Further for explanatory purposes, the boxes of the example process 400 are described herein as occurring in serial, or linearly. However, multiple boxes of the example process 400 may occur in parallel. In addition, the boxes of the example process 400 may be performed a different order than the order shown and/or one or more of the boxes of the example process 400 may not be performed.

The exemplary method of FIG. 4 incudes forming at least one opening in a first chamber (box 402).

The method further includes forming at least one aperture in a second chamber (box 404). In some embodiments, the second chamber may be adjacent and fixed to the first chamber.

The method further includes forming at least one port in a heat manifold (box 406).

The method further includes forming at least one wall inside the heat manifold to partition the heat manifold (box 408).

The method further includes coupling at least one source vent to the heat manifold and the first chamber (box 410). In some embodiments, the at least one source vent extends between and couples the at least one port of the heat manifold to the at least one opening of the first chamber.

In some embodiments, the method of coupling the at least one source vent to the heat manifold and the first chamber further comprises of coupling the at least one source vent to a first port of the heat manifold and coupling at least one exhaust vent to the heat manifold to thereby protrude from a surface of the heat manifold, wherein the heat manifold includes a second port, and a first end of the at least one exhaust vent couples to the second port of the heat manifold.

In some embodiments, the method of coupling the at least one exhaust vent to the heat manifold to thereby protrude from the surface of the heat manifold, further comprises coupling a second end of the at least one exhaust vent to the at least one aperture of the second chamber.

In some embodiments, the second chamber includes an upper surface and a lower surface and the at least one aperture is positioned on the upper surface of the second chamber, and the method of coupling the second end of the at least one exhaust vent to the at least one aperture of the second chamber further comprises the at least one exhaust vent protruding through the at least one aperture of the second chamber and including a cutout extending between the upper surface and the lower surface of the second chamber.

In some embodiments, the heat manifold includes a top surface and a bottom surface and the method further comprises a third port positioned at the top surface and the first port positioned at the bottom surface, wherein coupling at least one source vent to the heat manifold and the first chamber, further comprises the at least one source vent extending through the first and third ports of the heat manifold and including a cutout extending between the top surface and the bottom surface of the heat manifold.

Figure 5:
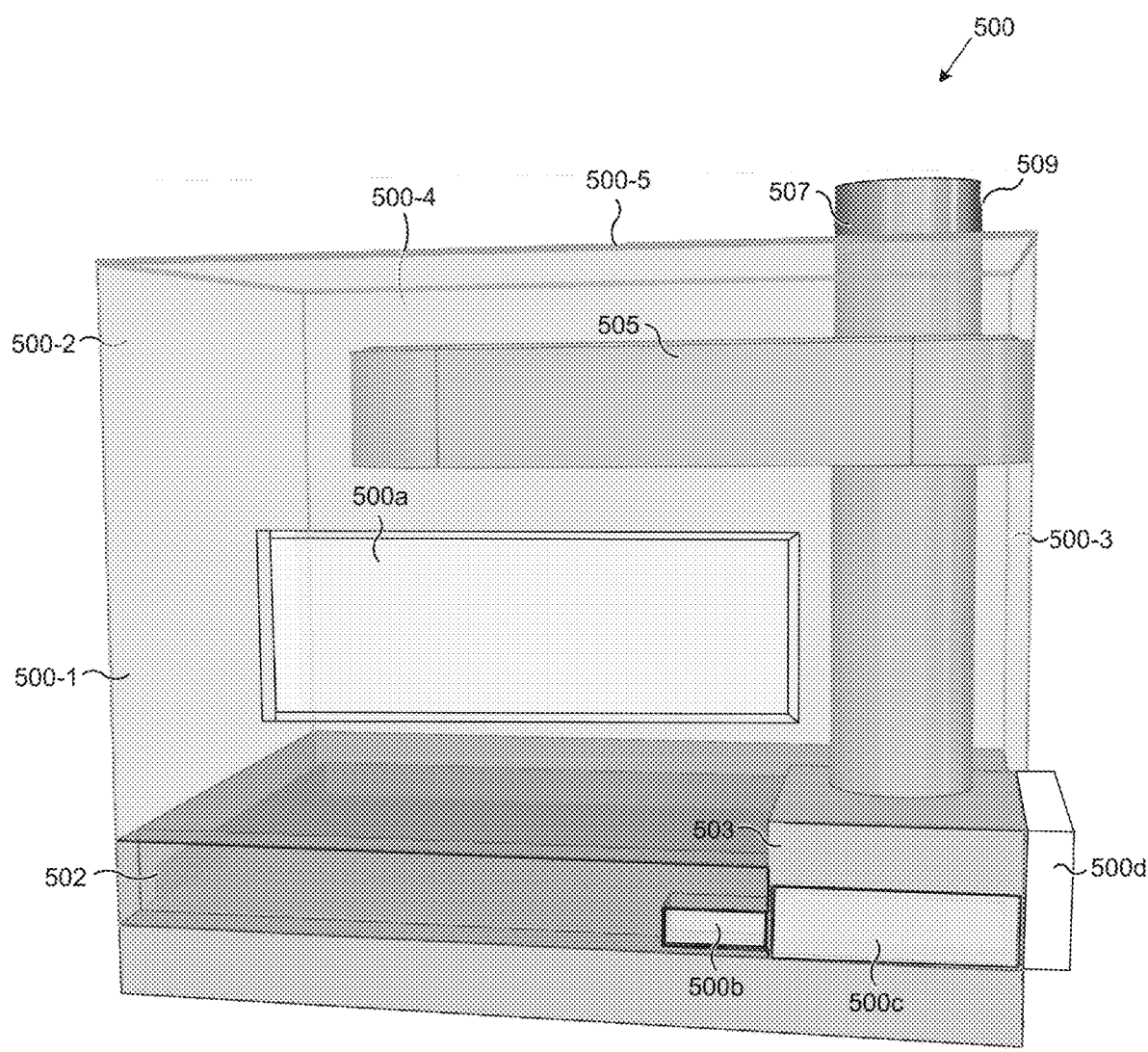
FIG. 5 is a left perspective view of an assembled exemplary portable oven in accordance with an exemplary embodiment of the present disclosure.

FIG. 5 is a left perspective view of an assembled exemplary portable oven in accordance with an exemplary embodiment of the present disclosure. As can be seen with reference to FIG. 5, an exemplary portable oven 500 may include a top surface 500-5 and one or more peripheral surfaces 500-1, 500-2, 500-3 and 500-4 that cover and house the conduction chamber 502, burn chamber 503, heat chamber 505, source vent 507, and exhaust vent 509. The portable oven 500 may include one or more doors 500a, 500b, 500c. In some embodiments, door 500a may be used to cover, enclose, or seal the components (e.g., heat chamber 505, etc.) and food items inside the portable oven 500. The door 500a may be a swing door, a retractable door, a slidable door, a removably fixed or secure door, or any combination thereof. In some embodiments, door 500b may be used to cover, enclose, or seal the interior space of the conduction chamber 502 from the outside environment. In some embodiments, the door 500b may a swing door, a retractable door, a slidable door, a removably fixed or secured door or cover, a snap on door or cover, or any combination thereof. In some embodiments, door 500c may be used to cover, enclose, or seal the interior space of the burn chamber 503 from the outside environment. In some embodiments, the door 500c may a swing door, a retractable door, a slidable door, a removably fixed or secured door or cover, a snap on door or cover, or any combination thereof.

In some embodiments, the portable oven 500 may include one or more fans 500d. In some embodiments, the one or more fans 500d may slide into and replace a panel of the burn chamber 503. In some embodiments, the one or more fans 500d may be installed inside the burn chamber 503, and on a distal end of the burn chamber 503. In some embodiments, one or more fans 500d may be installed on and over the opening 103b. Although the fan 500d is shown as being installed on a side surface of the burn chamber 503, one or more fans 500d may be installed on a bottom interior surface 103-2 and around a perimeter of the fuel source or heating source. Moreover, in some embodiments, one or more apertures 103c may be formed to provide air flow from one or more fans 500d installed in ash tray 111b and around a perimeter of the fuel source or heating source. In some embodiments, one or more fans 500d may be installed or attached to the opening 103b of the burn chamber 503, for example, one or more fans 500d may be inserted, attached, or slidably installed as a front panel and cover of the opening 103. In some embodiments, in addition to, or in alternative to the above, the portable oven 500 may include one or more fans 500d that slide into and replace a panel of the conduction chamber 502, the heat chamber 505, and/or replace any surface 500-1, 500-2, 500-3, 500-4, or 500-5 or any combination thereof.

In some embodiments, the exterior surface of the top surface 500-5 may be a warming surface to keep food items warm. The top surface 500-5 may be heated through by heat and air flow from the one or more apertures 252a, 252b, 252c, 252d, 254a and 254b extending through one or more upper, lower and peripheral interior surfaces 205-1, 205-2, and 205-3 of the heat chamber 505. Moreover, in some embodiments, heat radiated from the top surface 505-1 of the heat chamber 505 may provide heat to the top surface 500-5 to warm or keep warm food items placed on the top surface 500-5. In some embodiments, the heat chamber 505 of the portable oven 500 may be configured to be closer to the top surface 500-5 of the portable oven 500 to provide enough heat and air flow or radiated heat to warm, or keep warm, food items placed on the top surface 500-5.

The devices, systems and functions described herein may be implemented in interior and exterior heating devices, ovens, and other portable devices used to heat, cook, or warm food items. Other examples and implementations are within the scope of the disclosure and appended claims. Features implementing these devices, systems and functions may also be physically located at various positions, including being distributed such that portions of these devices, systems and functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, the terms "vertical," "lateral," "upper," "lower," "above," and "below" can refer to relative directions or positions of features in the semiconductor devices in view of the orientation shown in the Figures. For example, "upper" or "uppermost" can refer to a feature positioned closer to the top of a page than another feature. These terms, however, should be construed broadly to include semiconductor devices having other orientations, such as inverted or inclined orientations where top/bottom, over/under, above/below, up/down, and left/right can be interchanged depending on the orientation.

It should be noted that the methods described above describe possible implementations, and that the operations and the steps may be rearranged or otherwise modified and that other implementations are possible. Furthermore, embodiments from two or more of the methods may be combined.

From the foregoing, it will be appreciated that specific embodiments of the present disclosure have been described herein for purposes of illustration, but that various modifications may be made without deviating from the scope of the present disclosure. Rather, in the foregoing description, numerous specific details are discussed to provide a thorough and enabling description for embodiments of the present disclosure. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the present disclosure. In general, it should be understood that various other devices, systems, and methods in addition to those specific embodiments disclosed herein may be within the scope of the present disclosure.

What is claimed:

1. An oven comprising:
   a burn chamber, the burn chamber including at least one opening;
   a conduction chamber, the conduction chamber being adjacent to the burn chamber and including at least one aperture;
   a heat manifold, the heat manifold including a first port and a second port;
   at least one source vent extending between and coupling the first port of the heat manifold to the at least one opening of the burn chamber;
   at least one exhaust vent, the at least one exhaust vent protruding from a surface of the heat manifold and extending between and coupling the second port of the heat manifold to the at least one aperture of the conduction chamber; and
   a movable tray positioned below the burn chamber and conduction chamber.

2. The oven of claim 1, wherein the conduction chamber includes an upper surface and a lower surface, the at least one aperture being positioned on the upper surface of the conduction chamber, wherein the at least one exhaust vent protrudes through the at least one aperture of the conduction chamber and includes a cutout extending between the upper surface and the lower surface of the conduction chamber.

3. The oven of claim 1, wherein either the at least one source vent or the at least one exhaust vent, or both, comprise an inner surface and an outer surface, and wherein gas can travel within the outer surface or between the inner surface and the outer surface.

4. The oven of claim 3, wherein the inner surface and outer surface include one or more cutouts.

5. The oven of claim 1, wherein the heat manifold includes at least one notch, cutout, hole, slit, or combination thereof extending from an interior surface of the heat manifold through to an exterior surface of the heat manifold.

6. The oven of claim 1, wherein the heat manifold includes at least one wall partitioning the heat manifold.

7. The oven of claim 6, wherein the at least one wall includes at least one notch, cutout, hole, slit, or combination thereof.

8. The oven of claim 1, wherein the heat manifold includes a top and a bottom surface, wherein the first port is positioned at the bottom surface, and the heat manifold further comprises a third port positioned at the top surface, wherein the at least one source vent extends through the first and third ports and includes a cutout extending between the top and bottom surfaces of the heat manifold.

9. The oven of claim 1, further comprising at least one flap cover positioned over an end of either the at least one source vent, the at least one exhaust vent, or both.

10. The oven of claim 1, wherein the burn chamber is dimensioned to accept and position below the at least one source vent a prepackaged can of liquid fuel.

11. The oven of claim 1, wherein the at least one source vent includes a screen configured to support a solid fuel positioned between the burn chamber and the heat manifold.

12. An oven comprising:
    a burn chamber, the burn chamber including at least one opening;
    a conduction chamber, the conduction chamber being adjacent to the burn chamber and including at least one aperture;

a heat manifold, the heat manifold including a plurality of ports and at least one wall partitioning the heat manifold into an elongated path between the plurality of ports;

at least one source vent extending between and coupling a first port of the plurality of ports of the heat manifold to the at least one opening of the burn chamber;

at least one exhaust vent extending between and coupling a second port of the plurality of ports of the heat manifold to the at least one aperture of the conduction chamber; and a movable tray positioned below the burn chamber and conduction chamber.

13. The heating device of claim 12, wherein the heat manifold includes a top surface, a bottom surface and a third port, the first port being positioned at the bottom surface and the third port positioned at the top surface, wherein the at least one source vent extends through the first and third ports and includes a cutout extending between the top surface and the bottom surface of the heat manifold.

14. The heating device of claim 12, wherein the conduction chamber includes an upper surface and a lower surface, the at least one aperture being positioned on the upper surface of the conduction chamber, and wherein the at least one exhaust vent protrudes through the at least one aperture of the conduction chamber and includes a cutout extending between the upper surface and the lower surface of the conduction chamber.

15. A method of making an oven, the method comprising:
forming at least one opening in a first chamber;
forming at least one aperture in a second chamber, the second chamber being adjacent and fixed to the first chamber, wherein the second chamber includes an upper surface and a lower surface and the at least one aperture is positioned on the upper surface of the second chamber;

forming at least one port in a heat manifold;
forming at least one wall inside the heat manifold to partition the heat manifold;
coupling at least one source vent to the heat manifold and the first chamber, wherein the at least one source vent extends between and couples the at least one port of the heat manifold to the at least one opening of the first chamber, wherein coupling the at least one source vent to the heat manifold and the first chamber further comprises coupling the at least one source vent to a first port of the heat manifold coupling at least one exhaust vent to the heat manifold to thereby protrude from a surface of the heat manifold, wherein the heat manifold includes a second port, and a first end of the at least one exhaust vent couples to the second port of the heat manifold, and wherein coupling the at least one exhaust vent to the heat manifold further comprises coupling a second end of the at least one exhaust vent to the at least one aperture of the second chamber, the at least one exhaust vent protruding through the at least one aperture of the second chamber and including a cutout extending between the upper surface and the lower surface of the second chamber.

16. The method of claim 15, wherein the heat manifold includes a top surface and a bottom surface and further comprises a third port positioned at the top surface and the first port positioned at the bottom surface, wherein coupling at least one source vent to the heat manifold and the first chamber, further comprises:
the at least one source vent extending through the first and third ports of the heat manifold and including a cutout extending between the top surface and the bottom surface of the heat manifold.

* * * * *